Sept. 18, 1945.    M. J. BROWN    2,384,792
IMPULSE METERING SYSTEM
Filed Dec. 3, 1942
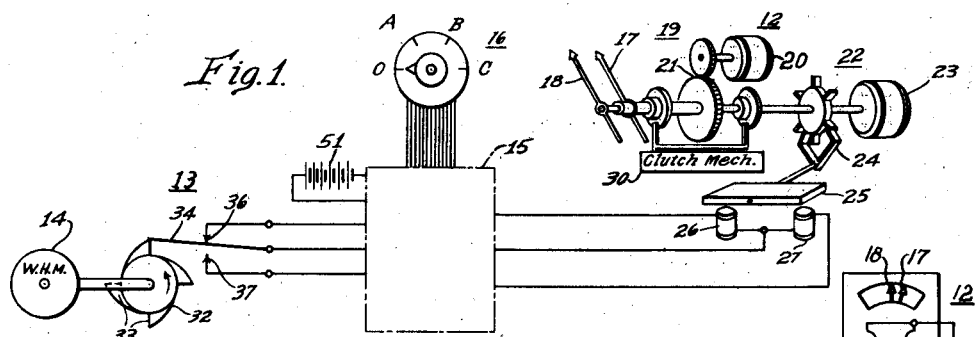
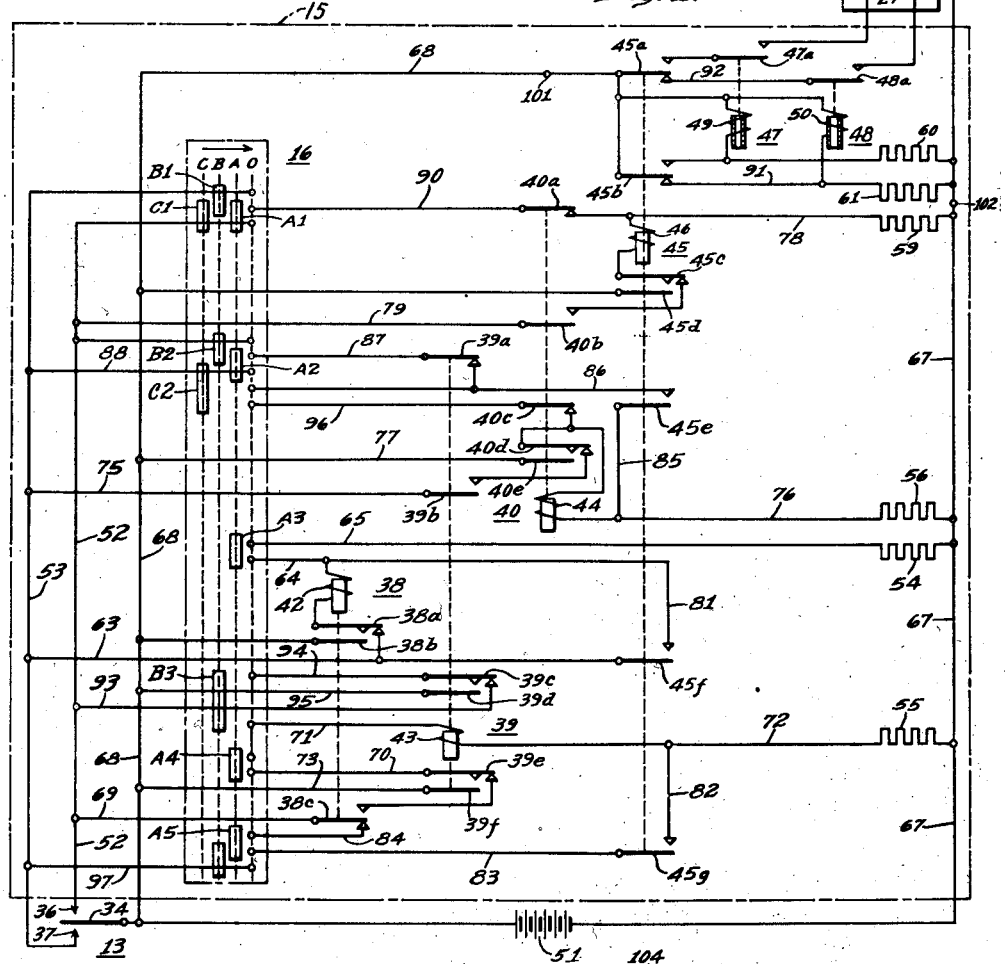
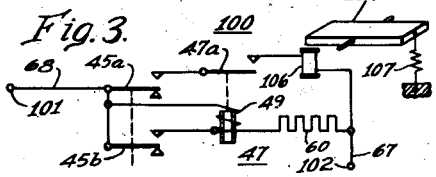
WITNESSES:
INVENTOR
Myron J. Brown.
BY
ATTORNEY Patented Sept. 18, 1945

2,384,792

UNITED STATES PATENT OFFICE 2,384,792

IMPULSE METERING SYSTEM

Myron J. Brown, Forest Hills, Pa., assignor to Westinghouse Electric Corporation, East Pittsburgh, Pa., a corporation of Pennsylvania Application December 3, 1942, Serial No. 467,735

9 Claims. (Cl. 177—351)

My invention relates, generally, to impulse metering systems and it has reference in particular to an impulse submultiplier for impulse demand metering systems.

Generally stated, it is an object of my invention to provide an impulse submultiplier that is simple and inexpensive to manufacture and is easy to operate.

More specifically, it is an object of my invention to provide an impulse submultiplier circuit for an impulse demand meter system whereby the number of impulses applied to a receiver may be varied relative to the number of impulses supplied by a transmitter.

It is also an object of my invention to provide for changing the ratio of impulses received to impulses transmitted in an impulse demand meter system, so as to permit operation at different demand rates.

Another object of my invention is to provide for using a plurality of impulse counters in a submultiplier circuit to control impulse producing means for operating an impulse ideal-actual demand meter on different demand rates.

A further object of the invention is to provide for operating an ideal-actual demand meter on different ideal demand rates by utilizing a control circuit to divide the number of impulses transmitted by different predetermined constants, and transmit to the actual element of the receiving meter a number of impulses equal to the quotient.

Other objects will in part be obvious, and will in part be explained hereinafter.

According to my invention an ideal-actual demand meter system, having an impulse transmitter for effecting operation of the actual element of the receiver, is arranged to provide for operation on a plurality of ideal demand rates. An impulse divider or submultiplier cicuit is connected between the impulse transmitter and the impulse operated actual demand element of the receiver. A ratio change switch controlling the circuit connections in the submultiplier circuit is pre-positionable to a plurality of different operating positions. According to the different positions of the ratio change switch, the submultiplier circuit transmits to the actual demand element of the receiver demand meter different numbers of impulses equal to different fractions of the number of impulses produced by the impulse transmitter. By thus rationing the number of impulses transmitted to the number of impulses received, the relative speed of operation of the actual and ideal elements of the receiver demand meter is changed, in effect changing the ideal rate on which the meter is operating.

For a more complete understanding of my invention reference may be had to the following detailed description, which should be studied in connection with the accompanying drawing in which:

Figure 1 represents diagrammatically an ideal-actual impulse demand meter system embodying the principal features of the invention;

Fig. 2 represents diagrammatically a detailed circuit diagram of the meter system illustrated in Fig. 1; and Fig. 3 represents diagrammatically a portion of a demand meter system which may be substituted in the system of Fig. 2.

Referring to Fig. 1, an ideal-actual impulse demand meter system is shown wherein an ideal-actual receiver demand meter 12 is connected for operation in response to impulses produced by an impulse transmitter 13, which may be operated by a watt-hour meter 14 or the like. Means may be provided for operating the meter on different ideal demand rates, such as the impulse divider or submultiplier 15, which may be connected between the impulse transmitter 13 and the demand meter 12 for varying the number of impulses transmitted to the receiver demand meter 12 relative to the number of impulses produced by the transmitter 13. The submultiplier 15 may be provided with a ratio change switch 16 for changing the ratio between the number of impulses transmitted and received. If desired, the submultiplier, transmitter and ideal-actual meter receiver may be located together, or one or more of the elements may be located apart from the others for remote metering.

As shown in Fig. 1, the ideal-actual receiver demand meter 12 may, for example, comprise a pair of pointers or indicators 17 and 18 which may be operated in accordance with a predetermined ideal demand rate and an actual demand rate, respectively. For example, the indicator 17 of the ideal demand element 19 may be operated at substantially constant rate by means of a motor 20 and gears 21. The indicator 18 of the actual demand element 22 may be operated by means of a torque motor 23 under the control of an escapement mechanism 24 which may be controlled in accordance with the actual demand rate, such as by means of an armature 25 and solenoid operating windings 26 and 27 in response to impulses produced by the meter 14 and impulse transmitter 13. A suitable clutch mechanism 30 may be provided for releasing the ideal and actual demand indicators at the end of a predetermined demand interval. Suitable means, well known in the art, may be provided for signalling when the actual rate equals or exceeds the ideal. Contact means may be provided in connection with the indicators, such as for example, contact members which may engage when the indicator 18 overtakes the indicator 17, thus completing a suitable signal circuit. For the purpose of simplifying the drawing, no such means has been shown, as it is a known expedient in the art.

The impulse transmitter 13 may be of any suitable type comprising, for example, a rotatable cam 32 driven by the rotating element of the meter 14 and having projections 33 thereon for actuating a movable contact arm 34 to alternately engage fixed contact members 36 and 37 associated therewith. As the rotating element of the watt-hour meter 14 rotates, the projections 33 successively engage the contact arm 34 actuating it to alternately engage the fixed contact members 36 and 37 at a rate which is proportional to the speed of the rotating element of the watt-hour meter 14, or the actual demand.

In order to provide for operating the demand meter 12 on different ideal demand rates, the impulse submultiplier 15 connected between the impulse transmitter 13 and the demand meter 12 may be utilized to vary the number of impulses applied to the solenoid windings 26 and 27 relative to the number of impulses produced by the transmitter 13.

As shown in Fig. 2, a plurality of impulse counter relays 38, 39 and 40 having operating windings 42, 43 and 44, respectively, may be provided for controlling the operation of an impulse relay 45 by controlling the energization of its operating winding 46. The counter relays 38, 39 and 40, and the impulse relay 45 may be provided with normally open contact members 38b, 39d, 39f, 40e and 45d, which make contact to provide holding circuits for the operating windings 42, 43, 44 and 46, respectively, before associated normally closed contact members 38a, 39c, 39e, 40d and 45c open.

Control relays 47 and 48, which are preferably of the delayed dropout type, and having operating windings 49 and 50 energizable under the control of the impulse relay 45, may be utilized to determine the duration of the impulses produced thereby.

In order to provide for operation of the impulse relay 45 different predetermined numbers of time in response to a given number of impulses produced by the transmitter 13 when operating on different ideal demand rates, the ratio change switch 16 is provided, comprising, for example, a rotatable switch of the drum type having a plurality of contact members or segments A, B, C and D mounted on a rotatable drum, and arranged to complete different circuits through a plurality of fixed contact members in different drum positions. The segments may be utilized for effecting different connections of the operating windings 42, 43 and 44 to one or the other of a pair of control buses 52 and 53 which may be connected to the contact members 36 and 37, respectively, of the transmitter 13.

The movable contact arm 34 of the transmitter may be connected to one terminal of a suitable source, such as the battery 51, while the other terminal of the battery may be connected to one terminal of each of the operating windings 42, 43 and 44 through current limiting resistors 54, 55 and 56, respectively. Similar resistors 59, 60 and 61 may be provided for the operating windings 46, 49 and 50. The other terminals of the windings 42, 43 and 44 may be connected to one or another of the buses 52 and 53 through contact members of the different impulse counter relays and segments of the ratio control switch so that the counter relays and the impulse relay operate in different sequences for different positions of the ratio switch. Shunt circuits for deenergizing the windings 42, 43 and 44 may be provided through segments of the ratio control switch and contact member of the counter and impulse relays.

For example, with the ratio change switch 16 operated to the "A" position, when the moving contact arm 34 of the transmitter 13 engages the stationary contact member 37 and connects the bus 53 to the positive terminal of the battery for one impulse, a circuit is completed through the operating winding 42 of the impulse counter relay 38 from one terminal of the battery 51, through contact arm 34, contact member 37, conductor 53, conductor 63, contact member 38a, operating winding 42, conductor 64, contact member A3, conductor 65, resistor 54, and conductor 67 to the other side of the battery 51. Relay 38 operates, closing contact member 38b prior to opening contact member 38a, so as to establish a holding circuit for the winding 42 through control bus 68, and raising contact member 38c into engagement with the associated upper stationary contact member. No further operations occur while the contact arm 34 engages the lower contact member 37 of the impulse transmitter.

When the contact arm 34 engages the upper contact member 36 to produce the next impulse, an energizing circuit is completed for the operating winding 43 of the impulse counter relay 39, from the contact member 36 through conductor 52, conductor 69, contact member 38c and the upper stationary contact member, contact member 39c, conductor 70, contact member A4, conductor 71, operating winding 43, conductor 72, resistor 55 and conductor 67 to the negative terminal of the battery 51. Impulse counter relay 39 operates, closing contact member 39f prior to opening contact member 39e, so that a holding circuit for the operating winding 43 is completed by contact member 39f through the conductors 70 and 73 to the positive terminal of the battery 51. Contact member 39b also closes.

When the contact arm 34 next engages the lower contact member 37 for the third impulse, an energizing circuit is completed for the operating winding 44 of impulse counter relay 40, from conductor 53, through conductor 75, contact member 39b, normally closed contact member 40d, operating winding 44, conductor 76, resistor 56 and conductor 67 to the negative side of the battery 51. Impulse counter relay 40 operates, closing contact member 40e prior to opening contact member 40d, thereby completing a holding circuit for the operating winding 44 through contact member 40e and conductor 77 to the positive side of the battery 51.

Closure of contact member 40b provides an energizing circuit for the operating winding 46 of the impulse relay 45 when the contact arm 34 next engages the upper contact member 36 for the fourth impulse from the negative side of the battery 51 through conductor 67, resistor 59, conductor 78, operating winding 46, contact member 45c, contact member 40b, conductor 79, conductor 52, contact member 36, and contact arm 34 to the other terminal of the battery 51. Closure of the normally open contact members 45b connects a shunt across the operating winding 49 of the control relay 47, which is normally energized.

Since the control relay 47 is of the time delay type, a circuit for applying an impulse of energy to the solenoid 26 of the escapement operating mechanism is completed through contact member 47a and contact member 45a across the battery 51 for a predetermined time until the control relay 47 drops out, so that one impulse of the four transmitted by the transmitter 13 is effective to provide for advancement of the actual demand indicator 18 of the demand meter 12 the equivalent of one impulse, through operation of the armature 25.

Upon the next operation of the contact arm 34 to engage the lower contact member 37 for the fifth impulse, the operating winding 42 of the counter relay 38 is short-circuited by the shunt circuit extending from the control bus 68, through contact arm 34, contact member 37, conductor 53, conductor 63, contact member 45f, and conductor 81. The impulse counter relay 38 returns to the deenergized position, closing contact members 38c.

When the contact arm next engages the upper contact member 36 for the sixth impulse, a shunt is provided about the operating winding 43 of the counter relay 39 through conductor 82, contact member 45g, conductor 83, contact member A5, conductor 84, contact member 38c and conductor 69 to contact member 36 and contact arm 34 to control bus 68. Closure of contact member 39a likewise places a shunt circuit about the operating winding 44 of the impulse counter relay 40 when the contact arm engages the lower contact member 37 for the seventh impulse, extending from the conductor 76, through conductor 85, contact member 45e, conductor 86, contact member 39a, conductor 87, contact member A2, conductor 88, conductor 53, contact member 37 and contact arm 34 to control bus 68.

Upon the next operation of the contact arm 34 to engage contact member 36 for the eighth impulse, a shunt is placed about the operating winding 46 of the impulse relay 45 through contact member 40a, conductor 90, contact member A1, conductor 52, contact member 36 and contact arm 34 to the control bus 68, deenergizing the impulse relay. Upon deenergization of the impulse relay 45, contact members 45b open, breaking the shunt circuit about the operating winding 49, and permitting the control relay 47 to return to the energized position. At the same time contact member 45b returns to the deenergized position, connecting a shunt circuit about the operating winding 50 of the control relay 48 through conductor 91.

Since the control relay 48 is of the time delay type and does not return to the deenergized position until a predetermined time after the closure of the contact members 45b, the operating winding 27 of the escapement mechanism is connected across the battery 51 through conductor 68, contact member 45a, conductor 92 and contact member 48a for a predetermined interval and receives an impulse of energy so as to be energized to actuate the armature 25 to provide for advancement of the actual demand indicator 18 the equivalent of another step or impulse.

Thus for eight impulses produced by the impulse transmitter 13 only two impulses are applied to the escapement mechanism 24 of the actual demand element of the demand member 12, providing in effect a ratio of 4:1 between the impulses received and transmitted by the submultiplier 15. Upon subsequent operation of the contact arm to the down position the sequence above described repeats. The meter is thus in effect operating on an ideal demand rate which is four times the normal rate.

With the ratio change switch 16 operated to the "B" position, the sequence of operation of the impulse counter relays 38, 39 and 40 is changed so that a 3:1 ratio of impulses transmitted to impulses received may be provided. The impulse counter relay 38 is inoperative, since the A3 contacts through which its energizing circuit must be completed are open.

When the contact arm 34 engages the contact member 36 for the first impulse, an energizing circuit is completed for the impulse counter relay 39 from contact member 36 through conductor 52, conductor 93, contact member 39c, conductor 94, contact member B3, conductor 71, operating winding 43, and conductor 72 to the negative side of the battery 51, so that relay 39 operates to the energized position. A holding circuit is provided through the contact members 39d and c and conductor 95 to control bus 68.

An energizing circuit for the impulse counter relay 40 is completed when the contact arm 34 engages the contact member 37 for the second impulse, through the circuit extending from the contact member 37, through conductor 53, conductor 75, contact member 39b, contact member 40d, operating winding 44 and conductor 76 to the negative side of the battery 51. Counter relay 40 operates, closing contact member 40e prior to opening contact member 40d, so as to provide a holding circuit for the operating winding 44 through conductor 77 to the control bus 68.

Closure of the contact members 40b provides, upon the operation of the contact arm 34 to engage the contact member 36 for the third impulse, an energizing circuit for the operating winding 46 of the impulse relay 45, from conductor 52 through conductor 79, contact member 40b, contact member 45c, operating winding 46, conductor 78, and conductor 67 to the negative terminal of the battery 51. The impulse relay 45 operates so that contact member 45b, completes a shunt circuit about the operating winding 49 of the control relay 47, providing an impulse of predetermined duration for effecting energization of the operating winding 26 of the escapement mechanism 24 through contact members 45a and 47a. The actual demand pointer 18 is therefor advanced the equivalent of one step or impulse. At the same time the shunt about the winding 50 is removed and the relay returns to the energized position.

Upon a subsequent operation of the contact arm 34 to engage the contact member 37 for the fourth impulse, a shunt is provided about the operating winding 43 of the impulse counter relay 39, through the contact member 37, conductor 97, contact member B4, conductor 83, contact member 45b and conductor 82 in the manner similar to that hereinbefore described, so that the relay returns to the deenergized position.

Upon the subsequent operation of the contact arm 34 to engage the contact member 36 for the fifth impulse, a shunt is provided about the operating winding 44 of the impulse counter relay 40 through contact members 45e, 39a and B2, so that the relay 40 returns to the deenergized position.

When the contact arm 34 subsequently engages the contact member 37 for the sixth impulse, a shunt is provided about the operating winding 46 of the impulse relay 45 through contact members 40a and B1 to contact member 37. The impulse relay 45 returns to the deenergized position to provide a shunt about the operating winding 50 of the control relay 48, so that an impulse is transmitted to the operating winding 27 of the escapement mechanism 24 to advance the actual indicator 18 a second step. For subsequent operations of the contact arm 34 the cycle of operations hereinbefore described repeats.

Accordingly, only one impulse is applied to the escapement mechanism 24 in response to every three impulses produced by the transmitter 13, thus effecting a 3:1 ratio between the number of impulses transmitted and the number applied to the actual element of the demand meter 12. The meter 12 is thus in effect operating on an ideal demand rate three times the normal rate.

With the ratio change switch in the "C" position, both of the impulse counter relays 38 and 39 are inoperative, since the A and B contacts of the ratio change switch are both open, and an energizing circuit is provided for the operating winding 44 of the counter relay 40 when the contact arm 34 engages the contact member 37 for the first of a series of impulses, through the circuit extending from the contact arm 34 through contact member 37, conductor 53, conductor 88, contact member C2, conductor 96, contact member 40c, operating winding 44 and conductor 76 to the negative terminal of the battery 51. A holding circuit for the relay 40 is provided through contact members 40e to control bus 68.

When the contact member 34 engages the stationary contact member 36 for the second impulse, an energizing circuit is provided for the operating winding 46 of the impulse relay 45, through the circuit extending from contact member 36 through the conductor 52, conductor 79, contact member 40b, contact member 45c, operating winding 46, and conductor 78 to the negative terminal of the battery 51. Operation of the impulse relay 45 as hereinbefore described provides a shunt circuit about the operating winding 49 of the control relay 47, and produces an impulse which effects energization of the operating winding 26 of the escapement mechanism for a predetermined time interval and advances the actual demand pointer 18 one step.

Upon the subsequent engagement of the contact arm 34 with the contact member 37 for the third impulse, a shunt circuit is provided about the operating winding 44 of the impulse counter relay 40 through the circuit extending from the conductor 76, through conductor 85, contact member 45e, conductor 86, contact member C2, conductor 88, conductor 53, contact member 37, and contact arm 34 to the control bus 68. The impulse counter relay 40 returns to the deenergized position.

Upon the subsequent engagement of the contact member 34 with the contact member 36 for the fourth impulse, a shunt is provided about the operating winding 46 of the impulse relay 45 through the circuit extending from the control bus 68 through the contact arm 34, contact member 36, conductor 52, contact member C1, conductor 90 and contact member 40a. The impulse relay 45 returns to the deenergized position, removing the shunt from the winding 49 and completing a shunt about the operating winding 50 of the control relay 48, providing a second impulse for effecting energization of the operating winding 27 of the escapement mechanism 24 for a predetermined interval as hereinbefore described. Upon subsequent operations of the contact arm 34 the sequence above described repeats, so that one impulse is applied to the demand meter for every two impulses transmitted by the transmitter 13.

Accordingly, operation of the ideal-actual demand meter may be effected for an ideal demand rate twice as high as the normal demand rate. Operation on the normal demand rate may be readily effected by omitting the ratio switch 16 and connecting the control buses 52 and 53 directly to the non-common terminals of the solenoid windings 26 and 27, respectively.

Referring to Fig. 3, the reference numeral 100 denotes, generally, a portion of a modified form of demand meter system for operating a two-wire demand meter element instead of a three-wire element such as illustrated in Fig. 2. The portion of the system shown in Fig. 3 may be substituted for the corresponding portion of Fig. 2, being connected to conductors 67 and 68 at terminals 101 and 102. Instead of utilizing a pair of operating windings 26 and 27 to operate the escapement mechanism as in Fig. 2, the armature 104 of the escapement mechanism may be actuated by a single operating winding 106 and return of the armature 25 may be effected by means such as the spring 107. The single control relay 47 may be utilized for controlling energization of the operating winding 106, the control relay 48 being omitted. Accordingly, the conductors used in connection with the control relay 48 may also be omitted.

The remaining portion of the system of Fig. 3 operates substantially as hereinbefore described. Whenever the impulse relay 45 operates to the energized position, a shunt is provided about the normally energized winding 49 of the control relay through contact members 45b, and an energizing circuit for applying one impulse to the escapement operating winding 106 is completed through contact members 45a and 47a before the control relay returns to the deenergized position. When the control relay 47 returns to the deenergized position, the operating winding 106 of the escapement mechanism is deenergized and the spring 107 returns the armature 104 to its normal position effecting another operation of the escapement mechanism. No operation thereof is effected when the impulse relay 45 is subsequently deenergized, so that operation of the actual demand element of the meter 12 may be secured under different ideal demand rates.

From the above description and the accompanying drawing, it will be apparent that I have provided a simple and effective manner for controlling the operation of an ideal-actual demand meter. A multiplicity of different impulse ratios may be provided for operating the demand meter on different ideal demand rates, no operation other than the mere turning of a switch to the indicated ratio position is required for effecting these changes, so that little or no skill is required of the operator. An added advantage of my invention is that the relays used in the sub-multiplier circuit may be of the usual telephone type, which are simple and inexpensive, and durable in operation.

Since certain changes may be made in the above description and different embodiments of the invention may be made without departing from the spirit thereof, it is intended that all the matter contained in the above description or shown in the accompanying drawing shall be considered as illustrative, and not in a limiting sense.

I claim as my invention:

1. A telemetering system comprising, metering means at one station operable to produce a predetermined number of impulses in response to a predetermined flow of power in a circuit, additional metering means at a remote station, impulse producing means for controlling the additional metering means, a plurality of control relays connected to be selectively responsive to impulses from the metering means at the one station to effect operation of the impulse producing means, and switch means for operating the additional metering means on different metering rates connected between the control relays and the metering means at the one station operable to different positions to secure different numbers of operations of the impulse producing means for a given number of impulses produced by the metering means at said one station, whereby the operation of the additional metering means on different metering rates is simulated.

2. The combination with metering means at one station operable to produce a predetermined number of electrical energy impulses for a given flow of power in a circuit and an ideal-actual demand meter at another station having an ideal demand indicator operated at a predetermined rate and an actual demand indicator operated in response to impulses from the metering means, of means for effectively varying the ideal demand rate comprising, circuit means including a plurality of control relays operable in response to impulses from the metering means to produce energy impulses for operating the actual demand indicator, and a control switch connecting the control relays to the metering means positionable in different operating positions to produce different numbers of impulses for operating the actual demand indicator at different predetermined rates in response to a given number of impulses produced by the metering means.

3. The combination with a source of electrical energy an impulse producing means alternately connecting one terminal of the source to a pair of conductors, of a first relay means connected to one of the conductors, a second relay means connected to the other conductor, a third relay means connected to the said one conductor having contact means of the first and second relays connected in series therewith, a fourth relay means connected to the said other conductor having contact means of the third relay in series therewith, and additional relay means connected to the source arranged to remain in the energized position for a predetermined interval after deenergization operable under the control of said fourth relay means, switch means having contact means associated with said relays prepositionable in different operating positions to secure different numbers of operations of the additional relay means for a given number of operations of the impulse producing means.

4. An impulse system comprising, impulse producing means operable to connect a pair of conductors to one terminal of a source alternately, relay means connected for energization to the source and arranged to remain in the energized position for a predetermined time after deenergization, a control relay operable to effect deenergization of the relay means energizable from one of the conductors, an additional relay energizable from the other conductor controlling energization of the control relay, a relay energizable from said one conductor controlling the energization of the additional relay, an additional control relay energizable from the other conductor controlling the connection of the said relay to said one conductor, and switch means having a plurality of contact means prepositionable in different operating positions to change the connections of the relays to the conductors to effect operation of the control relay different numbers of times equal to different fractions of a given number of operations of the impulse producing means.

5. An impulse submultiplier for use with impulse producing means and impulse receiving means comprising, a pair of relay means operable to produce impulses of predetermined duration for effecting operation of the impulse receiving means, means including an impulse relay operable to different positions for alternately effecting operation of one or the other of the relay means, and first, second and third impulse counter relay means disposed to be energized sequentially and then deenergized in the same sequence in response to impulses from the impulse producing means said counter relays being connected to effect operation of said impulse relay from one position to the other each time a sequence is completed, and unitary multi-position switch means associated with the impulse counter relay means operable to different predetermined positions to remove one or more of the impulse counter relay means from the sequence, whereby the number of operations of the relay means for a given number of impulses from the impulse producing means is changed from 4:1 to 3:1 to 2:1.

6. An impulse submultiplier system, comprising a pair of control relay means having normally open contact means controlling the energization of an impulse operated device, said relay means being operable to remain in the energized position for a predetermined time after de-energization of the relay means, circuit means including an impulse relay having contact means for effecting energization of the relay means in alternate sequence and the energization of the impulse operated device to effect operation thereof and a chain of counter relays selectively operable to the energized position in predetermined sequence and thereafter successively deenergized in the same sequence in response to successive impulses of electrical energy to effect operation of the control relays, and unitary multi-position switch means connecting the counter relays and the impulse relay to a source of energy impulses operable to a plurality of different positions to selectively remove one or more of the counter relays from the sequence and increase the number of operations of the impulse relay for a given number of impulses applied to the impulse relay and the counter relays.

7. An ideal-actual demand metering system comprising, impulse transmitting means, an ideal-actual demand meter having an impulse operated actual demand element and an ideal demand element operating at a predetermined rate, and means for effectively varying the ideal demand rate comprising circuit means connected between the impulse transmitting means and the impulse operated actual demand element including a plurality of counting relays successively operable in predetermined sequence, switch means operable to different positions to change the number of relays operating in sequence and the ratio between the number of impulses received at the impulse operated element and the number of impulses transmitted by the transmitting means, whereby the operating rate of the actual demand element may be varied relative to the ideal demand rate.

8. A telemetering system comprising, impulse transmitting means at one station, impulse receiving means at a remote station including an impulse operated actual demand meter element, and circuit means including a counting chain comprising a plurality of relays operable in sequence on successive impulses from the impulse transmitting means associating the transmitting means and the actual demand element for effectively changing the demand rate at which the meter element operates including relay means responsive to impulses from the transmitting meter means and controlled by manually operable switch means operable to different positions to change the number of relays in the chain so that the circuit means apply to the actual demand meter element numbers of impulses that are different predetermined fractions of the number of impulses transmitted by the transmitting means.

9. An impulse system comprising, impulse transmitting means, impulse operated means, circuit means connecting the transmitting means and impulse operated means including a pair of impulse producing relays operable in different positions of a control relay, a plurality of impulse responsive relays which are successively energized and locked energized and are thereafter deenergized in the same order in response to successive impulses for effecting operation of the control relay at the end of each sequence to apply to the impulse operated means impulse which is a predetermined fraction of the number of impulses transmitted by the transmitting means, and unitary multi-position switch means connected for controlling the connections of the control relay and the impulse responsive relays operable to a plurality of different positions to effectively remove one or more of the impulse responsive relays from the sequential order and thereby effect more frequent operation of the control relay and vary the ratio between the number of impulses applied to the impulse operated means and the number transmitted by the transmitting means.

MYRON J. BROWN.